United States Patent
Ono (10) Patent No.: US 10,584,053 B2
(45) Date of Patent: Mar. 10, 2020

(54) MANUFACTURING METHOD OF GLASS SUBSTRATE WITH HOLE

(71) Applicant: AGC Inc., Chiyoda-ku (JP)

(72) Inventor: Motoshi Ono, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 179 days.

(21) Appl. No.: 15/666,946

(22) Filed: Aug. 2, 2017

(65) Prior Publication Data

US 2018/0037489 A1 Feb. 8, 2018

(30) Foreign Application Priority Data

Aug. 5, 2016 (JP) ................... 2016-154627

(51) Int. Cl.
| | |
|---|---|
| *C03B 33/08* | (2006.01) |
| *B23K 26/382* | (2014.01) |
| *B23K 26/402* | (2014.01) |
| *C03B 17/06* | (2006.01) |
| *C03C 15/00* | (2006.01) |
| *B23K 26/00* | (2014.01) |
| *B23K 26/359* | (2014.01) |
| *B23K 26/352* | (2014.01) |
| *C03C 23/00* | (2006.01) |
| *B23K 103/00* | (2006.01) |

(52) U.S. Cl.
CPC ........ *C03B 33/082* (2013.01); *B23K 26/0006* (2013.01); *B23K 26/355* (2018.08); *B23K 26/359* (2015.10); *B23K 26/382* (2015.10); *B23K 26/402* (2013.01); *C03B 17/064* (2013.01); *C03C 15/00* (2013.01); *C03C 23/0025* (2013.01); *B23K 2103/54* (2018.08)

(58) Field of Classification Search
CPC ............... B23K 26/355; B23K 26/359; B23K 26/0006; B23K 26/382; B23K 26/384; C03C 15/00; C03B 33/082
See application file for complete search history.

(56) References Cited

U.S. PATENT DOCUMENTS

| | | | |
|---|---|---|---|
| 2009/0013724 A1* | 1/2009 | Koyo | B23K 26/0093 65/31 |
| 2017/0088457 A1 | 3/2017 | Mori | |
| 2018/0029924 A1* | 2/2018 | Inoue | C03C 3/093 |

* cited by examiner

Primary Examiner — Joseph S Del Sole
Assistant Examiner — Mohamed K Ahmed Ali
(74) Attorney, Agent, or Firm — Oblon, McClelland, Maier & Neustadt, L.L.P.

(57) ABSTRACT

A manufacturing method of a glass substrate with a hole having a diameter $\phi_f$, and with a thickness $\theta_f$ includes setting a thickness $\theta_1$ of a glass plate that is to be processed; preparing a glass plate with the thickness $\theta_1$, having first and second surfaces opposite to each other; forming one initial characteristic object or two or more initial characteristic objects in the glass plate by irradiating the glass plate with a laser from a side of the first surface of the glass plate, the initial characteristic object having a size of a diameter $\phi_1$ on the first surface; and performing wet etching for the glass plate having the initial characteristic object, so that from the initial characteristic object a hole having the diameter $\phi_f$ on the first surface is formed, and a thickness of the glass plate is adjusted from $\theta_1$ to a target value of $\theta_f$.

9 Claims, 10 Drawing Sheets

MANUFACTURING METHOD OF GLASS SUBSTRATE WITH HOLE

CROSS-REFERENCE TO RELATED APPLICATION

The present application is based on and claims benefit of priority under 35 U.S.C. § 119 of Japanese Patent Applications No. 2016-154627, filed Aug. 5, 2016. The contents of the application are incorporated herein by reference in their entirety.

BACKGROUND OF THE INVENTION

1. Field of the Invention

The disclosure herein generally relates to a manufacturing method of a glass substrate having a hole, such as a through hole or a non-through hole.

2. Description of the Related Art

A technique has been known, so far, where a glass substrate having a hole, such as a through hole or a non-through hole, is manufactured by using a laser irradiation technique.

For example, for manufacturing a glass substrate with a through hole, typically,
(A) a step of preparing a glass substrate, which has first and second surfaces, and a first thickness;
(B) a step of irradiating with a laser from a first surface side of the glass substrate to form a through hole in the glass plate; and
(C) a step of performing wet etching to enlarge the through hole to a desired size, are performed.

When the step (C) is applied, though the through hole can be adjusted to have a size in a desired range, at the same time, the thickness of the glass substrate is decreased. Consequently, a problem arises where the final thickness of the glass substrate is deviated from a predetermined range.

Moreover, in order to avoid such a problem, when at the step (B) an attempt is made to form in advance a through hole with a size that is close to a predetermined size, a crack is likely to be generated in the glass substrate, and a yield rate of manufacturing is lowered. The present invention, in consideration of the above-described problem, aims at providing a method of manufacturing a glass substrate with a hole having a desired size and with a desired thickness at a high yield rate.

SUMMARY OF THE INVENTION

According to an aspect of the present invention there is provided a manufacturing method of a glass substrate with a hole having a diameter $\phi_f$, and with a thickness $\theta_f$. The method includes (1) setting a thickness $\theta_1$ of a glass plate that is to be processed;
(2) preparing a glass plate with the thickness $\theta_1$, having a first surface and second surface opposite to each other;
(3) forming one initial characteristic object or two or more initial characteristic objects in the glass plate by irradiating the glass plate with a laser from a side of the first surface of the glass plate, the initial characteristic object having a size of a diameter $\phi_1$ on the first surface; and
(4) performing wet etching for the glass plate having the initial characteristic object, so that from the initial characteristic object a hole having the diameter $\phi_f$ on the first surface is formed, and a thickness of the glass plate is adjusted from $\theta_1$ to a target value of $\theta_f$.

According to an aspect of the present invention, a method can be provided with which a glass substrate having a desired thickness provided with a hole having a desired size can be manufactured with a high yield rate.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, with reference to drawings, embodiments of the present invention will be described.

(Conventional Method of Manufacturing Glass Substrate Having Through Hole)

Figure 1A:
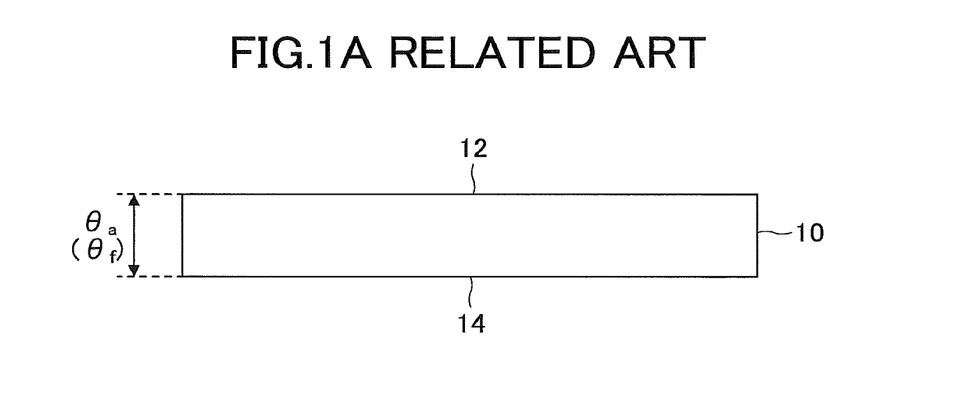
FIGS. 1A to 1C are diagrams schematically illustrating respective processes of a conventional method of manufacturing a glass substrate with a through hole according to related art.
Figure 1B:
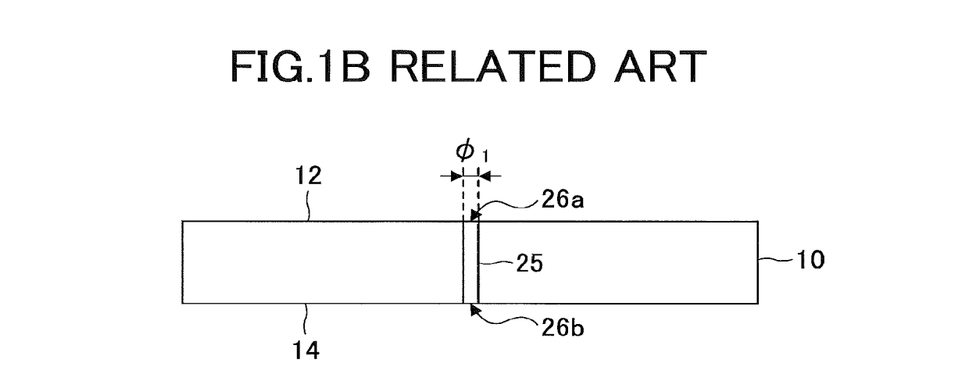
Figure 1C:
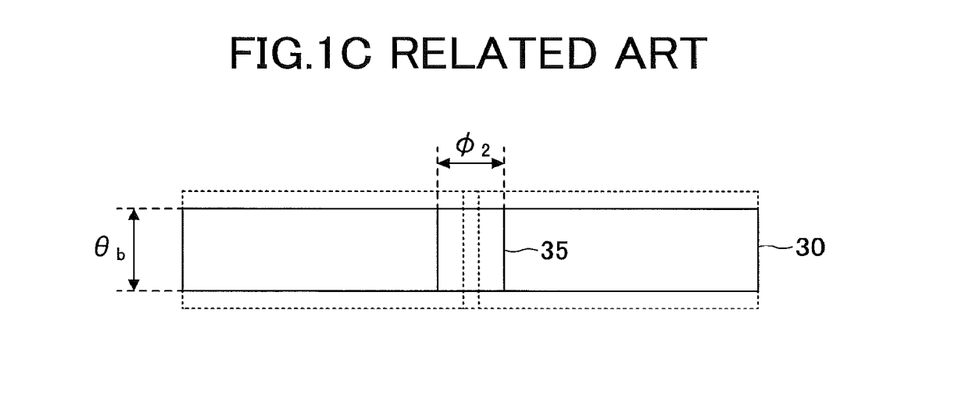

First, in order to gain a better sense of the feature of the present invention, with reference to FIGS. 1A to 1C, the conventional method of manufacturing a glass substrate having a through hole will be briefly described.

FIGS. 1A to 1C schematically illustrate modes of respective processes in the conventional method of manufacturing a glass substrate having a through hole.

The conventional method of manufacturing a glass substrate having a through hole (in the following, referred to as the "conventional method") includes, typically, (A) a step of preparing a glass plate having first and second surfaces, and a first thickness (first step);
(B) a step of irradiating with a laser from a first surface side of the glass plate to form a through hole (second step); and
(C) a step of performing wet etching for the glass plate having the through hole to enlarge a size of the through hole (third step).

First, at the first step, as illustrated in FIG. 1A, a glass plate 10 having a first surface 12 and a second surface 14 is prepared. The glass plate 10 has a thickness $\theta_a$. The thickness $\theta_a$ of the glass plate 10 is set to a final thickness target value $\theta_f$ of a glass plate having a through hole (therefore, $\theta_a = \theta_f$).

Next, in the second step, as illustrated in FIG. 1B, one through hole or two or more through holes 25 (in the following, referred to as an "initial through hole") is formed in the glass plate 10. The initial through hole 25 is formed by irradiating with a laser from a side of the first surface 12 of the glass plate 10. The initial through hole 25 has a first aperture 26a on a side of the first surface 12 of the glass plate 10, and a second aperture 26b on a side of the second surface 14 of the glass plate 10.

Typically, an initial through hole 25 is formed in a tapered shape so that a diameter decreases toward the second surface 14 from the first surface 12 of the glass plate 10. That is, a diameter of the first aperture 26a>a diameter of the second aperture 26b.

However, in this case, for simplicity, a cross-sectional diameter of the initial through hole 25 is assumed to be constant ($\phi_1$) along an extension direction of the initial through hole 25. That is, the diameter of the first aperture 26a and the diameter of the second aperture 26b are assumed to be $\phi_1$.

Typically, by the laser processing only, the diameter $\phi_1$ of the initial through hole 25 is often insufficient for a predetermined size. Then, in a typical case, a third step (wet etching process) is subsequently performed.

According to the third step, the glass plate 10 is subjected to wet etching, and thereby the initial through hole 25 is expanded to the predetermined size. For example, FIG. 1C depicts a change from the initial through hole 25 to a through hole 35 according to the wet etching for the glass plate 10. That is, the size of the first aperture 26a of the initial through hole 25 is expanded from $\phi_1$ to $\phi_2$.

According to the above-described process, a glass substrate 30 including a through hole 35 having a desired dimension can be manufactured.

In the above-described conventional method, in order to omit the third step, it might be considered to directly form a through hole having the predetermined dimension in advance (through hole 35), in the second step, by the laser processing. However, in the case of directly forming such a through hole having a large size, a crack is likely to be generated in the glass plate 10, and a yield rate of manufacturing is lowered. Therefore, omitting the third step is not practical from the viewpoint of productivity. Accordingly, in the conventional method, omitting the third step is not widely considered.

In the conventional method, as illustrated in FIG. 1C, by the third step, the glass plate 10 itself is subjected to etching, and the thickness decreases from $\theta_a$ to $\theta_b$. Therefore, there has been a problem that the thickness $\theta_b$ of the manufactured glass substrate 30 is insufficient to the target value $\theta_f$.

Until recent, an amount of change in the thickness of the glass plate 10 by the wet etching has not been comparatively great. The amount is, for example, on an order of a few tens of micrometers. Therefore, until recent, such a problem of change in the thickness of the glass plate 10 has seldom been of attention.

However, a glass substrate having a through hole is, for example, used for a glass interposer of a semiconductor component, or the like. In this field, recently, a high dimensional accuracy has been required for the glass substrate and the through hole. The required dimensional accuracy is often on an order of a few micrometers. Therefore, it has become necessary to apply measures even for a deviation of a thickness in a level of an order of a few tens of micrometers.

Moreover, the above-described problem is not a problem specific to the method of manufacturing a glass substrate having a through hole. Such a problem can similarly occur also for a method of manufacturing a glass substrate having a non-through hole.

An embodiment of the present invention provides a method of manufacturing a glass substrate with a hole having a diameter $\phi_f$, and with a thickness $\theta_f$, including (1) setting a thickness $\theta_1$ of a processed glass plate;
(2) preparing a glass plate having first and second surfaces opposite to each other, and the thickness $\theta_1$;
(3) forming one initial characteristic object or two or more initial characteristic objects on the glass plate by irradiating with a laser from a first surface side of the glass plate, the initial characteristic object having a size of a diameter $\phi_1$ on the first surface; and
(4) performing wet etching for the glass plate having the initial characteristic object, so that from the initial characteristic object a hole having the diameter $\phi_f$ on the first surface is formed, and the thickness of the glass plate is adjusted from $\theta_1$ to a target value of $\theta_f$.

In the above-described manufacturing method, at the step (1), the thickness $\theta_1$ of the glass plate is set so that after the wet etching for the glass plate at the step (4), the thickness of the glass substrate is the target value $\theta_f$ and the diameter of the hole on the first surface is $\phi_r$.

Therefore, in the embodiment of the present invention, it becomes possible to significantly remove the conventional problem that a final thickness of a glass substrate is deviated from a predetermined range after wet etching. Moreover, it becomes possible to manufacture a glass substrate having a hole of a desired size and having a desired thickness with a high yield rate.

It is necessary to pay attention that in the present application a "glass plate" and a "glass substrate" are used differently as a term. (However, this usage does not necessarily mean that both terms represent different members.)

Specifically, the "glass plate" represents a raw material (start) member that is provided for manufacturing the glass substrate, and an intermediate member in which some processes are performed for manufacturing the glass substrate.

The "glass substrate" means a glass member obtained after completing a presumed series of processes, in other words, a completed glass member. For example, in the present application, the glass plate on which a completed target hole is formed is referred to as a glass substrate. However, this member can also be directly referred to as a "glass plate". Therefore, a "glass plate" is a term including a "glass substrate".

(Method of Manufacturing Glass Substrate Having Hole According to Embodiment of Present Invention)

Next, with reference to FIGS. 2 to 8, an example of a method of manufacturing the glass substrate having a hole according to the embodiment of the present invention will be described.

Figure 2:
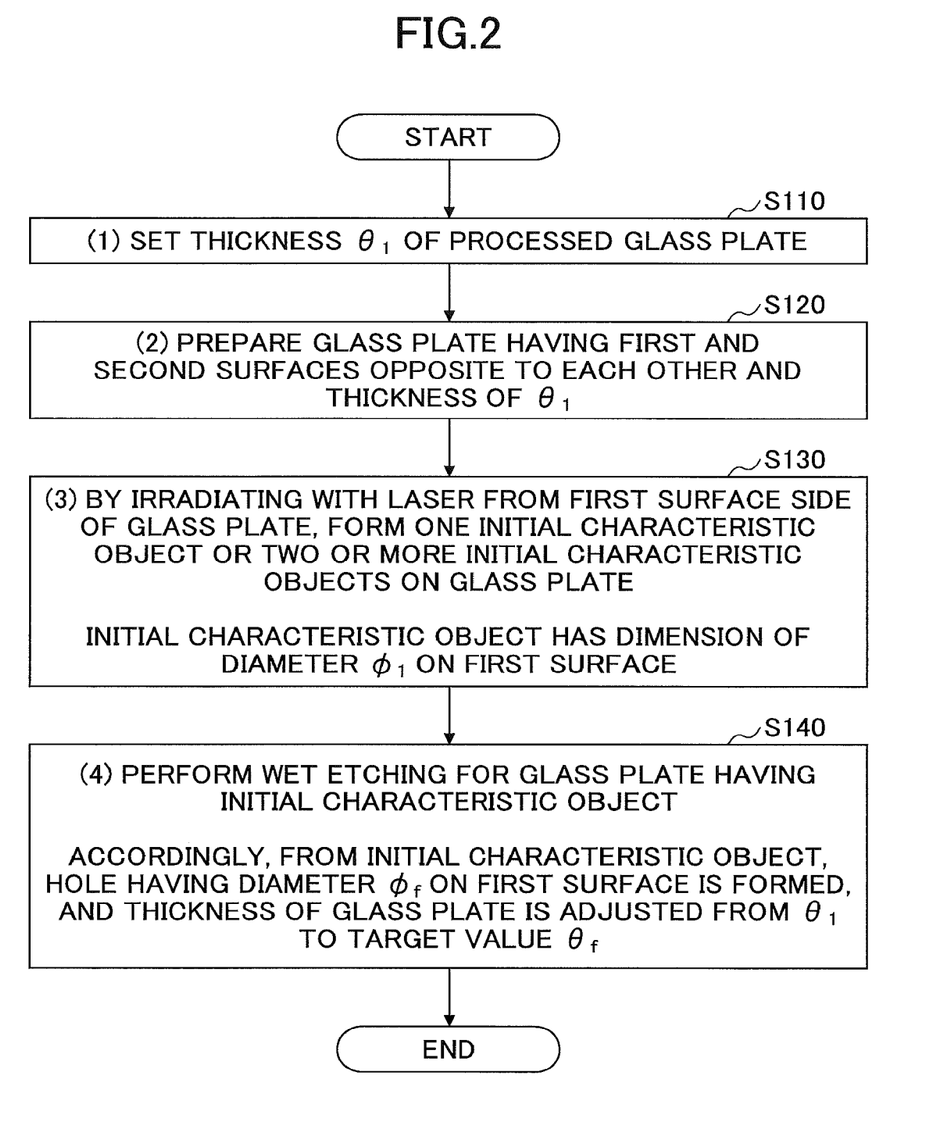
FIG. 2 is a diagram schematically illustrating a flow of a method of manufacturing a glass substrate with a hole according to an embodiment of the present invention.

FIG. 2 schematically illustrates a flow of the method of manufacturing a glass substrate with a hole according to the embodiment of the present invention.

As illustrated in FIG. 2, a method of manufacturing a glass substrate with a hole according to the embodiment of the present invention (in the following, referred to as a "first manufacturing method") includes (1) setting a thickness $\theta_1$ of a processed glass plate (step S110);

(2) preparing a glass plate having first and second surfaces opposite to each other, and the thickness $\theta_1$ (step S120);

(3) forming one initial characteristic object or two or more initial characteristic objects on the glass plate by irradiating with a laser from a first surface side of the glass plate, the initial characteristic object having a size of a diameter $\phi_1$ on the first surface (step S130); and (4) performing wet etching for the glass plate having the initial characteristic object, so that from the initial characteristic object a hole having the diameter $\phi_f$ on the first surface is formed, and the thickness of the glass plate is adjusted from $\theta_1$ to a target value of $\theta_f$ (step S140).

In the following, with reference to FIGS. 3 to 8, the respective steps will be described in detail. Here, as an example, the case where the hole formed at step S140 is a through hole will be described. Therefore, assuming that the first manufacturing method is a method of manufacturing a glass substrate having a through hole, the respective steps will be explained. However, it will be obvious for a person skilled in the art, that the following description can be applied similarly also to the method of manufacturing a glass substrate having a non-through hole.

(Step S110)

First, the thickness of the processed glass plate is set.

The method of setting the thickness of the processed glass includes various methods. In the following, with reference to FIGS. 3 to 6, an example of the methods will be described.

Figure 3:
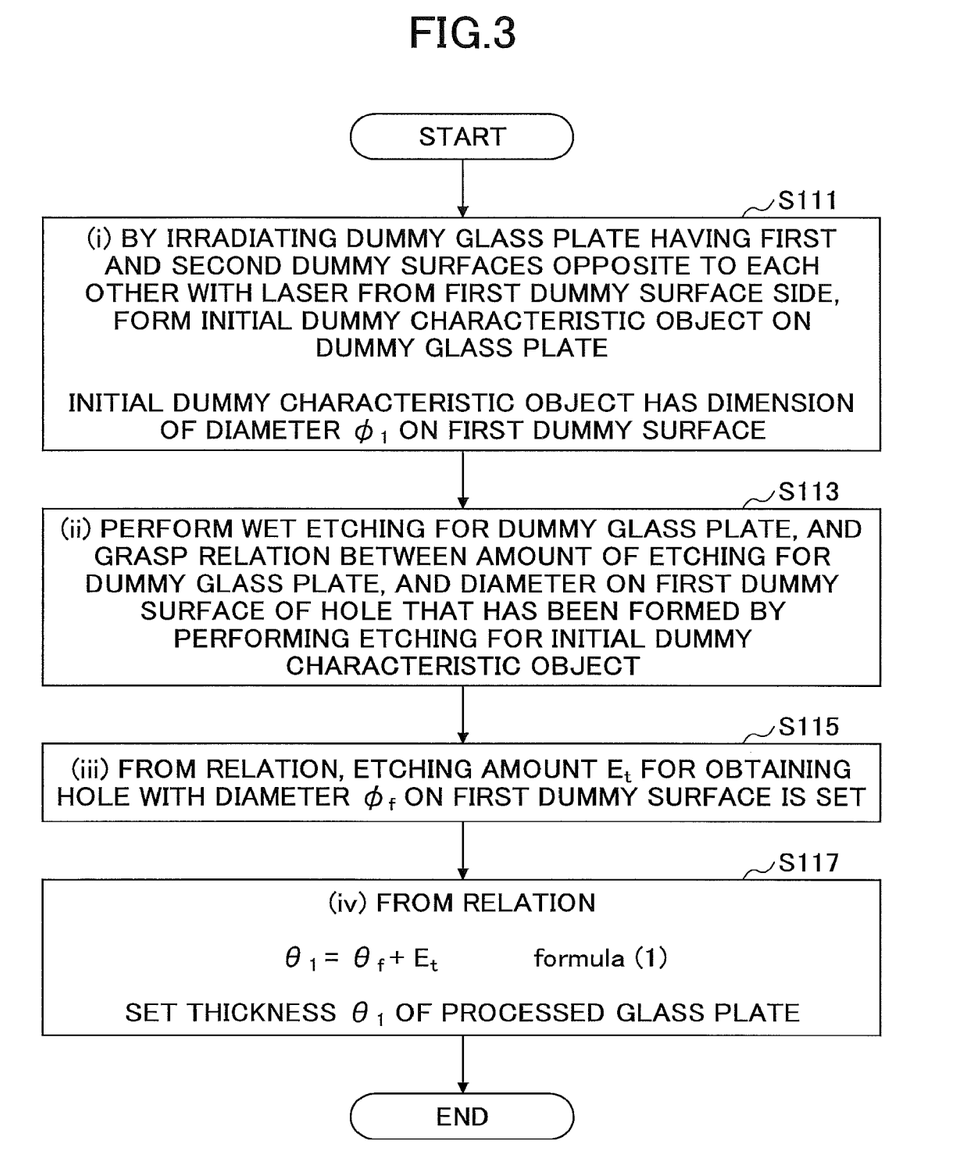
FIG. 3 is a diagram schematically illustrating a flow of a method of setting a thickness of a processed glass plate according to the embodiment of the present invention.
Figure 4:
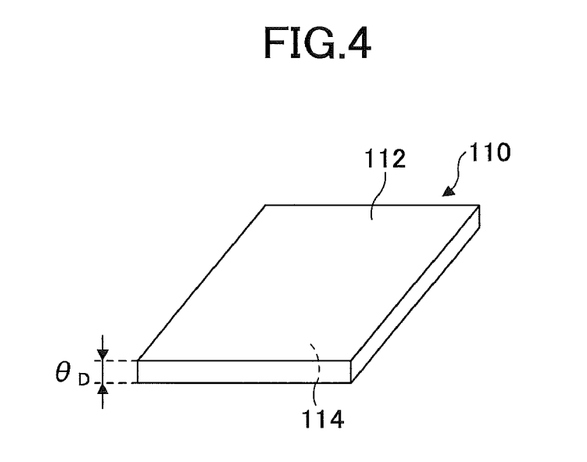
FIG. 4 is a diagram schematically illustrating one mode of a dummy glass plate according to the embodiment of the present invention.
Figure 5:
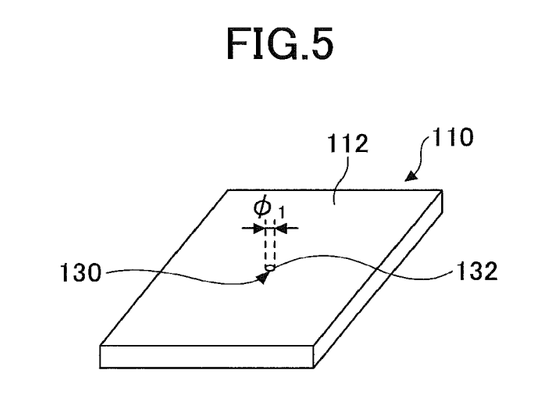
FIG. 5 is a diagram schematically illustrating one mode of the dummy glass plate having an initial dummy characteristic object according to the embodiment of the present invention.
Figure 6:
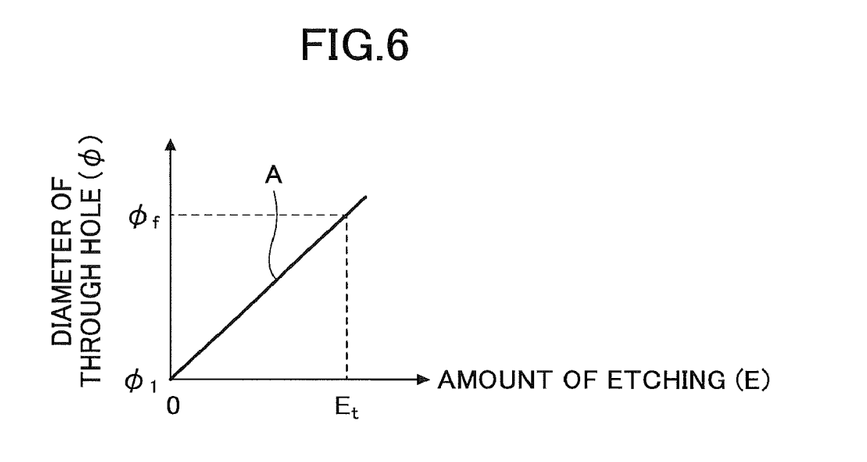
FIG. 6 is a diagram schematically showing an example of a relationship between amounts of etching E and diameters $\phi$ of the through holes.

FIG. 3 schematically illustrates a flow of a method of setting the thickness of the processed glass plate according to the embodiment of the present invention. Moreover, FIGS. 4 to 6 schematically illustrate diagrams for explaining a step in the method of setting the thickness illustrated in FIG. 3.

As illustrated in FIG. 3, the method of defining the thickness of the processed glass plate (in the following, referred to as a "thickness calculation method") includes (i) irradiating a dummy glass plate having first and second dummy surfaces opposite to each other with a laser from a side of the first dummy surface, and forming an initial dummy characteristic object on the dummy glass plate, the initial dummy characteristic object having a dimension of diameter $\phi_1$ on the first dummy surface (step S111);

(ii) performing wet etching for the dummy glass plate, and grasping a relation between an amount of etching for the dummy glass plate, and the diameter on the first dummy surface of a hole that has been formed by performing the etching for the initial dummy characteristic object (step S113);

(iii) setting, from the relation, an etching amount $E_t$ for obtaining a hole with the diameter $\phi_f$ on the first dummy surface (step S115); and (iv) setting the thickness $\theta_1$ of the processed glass plate from a relation $$\theta_1 = \theta_f + E_t. \qquad \text{formula (1)}$$

(Step S117)

In the following, the respective steps will be described.

(Step S111)

First, the dummy glass plate will be prepared.

A shape of the dummy glass plate is not particularly limited. The dummy glass plate may be, for example, a rectangular shape, or a circular shape. However, the dummy glass plate has the same composition as the processed glass plate, which will be described later.

FIG. 4 schematically illustrates one mode of the dummy glass plate.

As illustrated in FIG. 4, the dummy glass plate 110 includes a first surface 112 and a second surface 114 that opposite to each other. In the following description, in order not to confuse with the glass plate, which will be described later, upon using respective terms related to the dummy glass plate 110, a term "dummy" will be appended to the respective terms. Therefore, the first surface 112 and the second surface 114 are denoted as the first dummy surface 112 and the second dummy surface 114, respectively.

The dummy glass plate 110 has a thickness $\theta_D$. The value of the thickness $\theta_D$ is not particularly limited, as long as the thickness will not completely disappear by the wet etching process, which will be described later.

Next, the dummy glass plate 110 is irradiated with a laser from a side of the first dummy surface 112 of the dummy glass plate 110. According to this process, an initial dummy characteristic object is formed in the dummy glass plate 110.

The "initial dummy characteristic object" means any structure that can be generated in the dummy glass plate 110 by the laser irradiation.

For example, the "initial dummy characteristic object" may be a "hole", such as a through hole or a non-through hole.

Alternatively, the "initial dummy characteristic object" may be a void array configured by a plurality of voids arranged from the first dummy surface 112 of the dummy glass plate 110 toward the second dummy surface 114.

Moreover, the "initial dummy characteristic object" may be a modified layer (also referred to as a "modified line") formed in a line-shape from the first dummy surface 112 of the dummy glass plate 110 toward the second dummy surface 114.

Details of the initial dummy characteristic objects 130 will be better understood by referring to the explanation regarding the "initial characteristic object", which will be described later.

A type and an irradiating condition of the laser is not limited, as long as the above-described initial dummy characteristic object can be formed in the dummy glass plate 110. For example, when the initial dummy characteristic object is a "hole", such as a through hole or a non-through hole, the laser may be, for example, a $CO_2$ laser, a UV laser, or the like. Moreover, for example, when the initial dummy characteristic object is a void array, the laser may be, for example, a femtosecond laser or the like. Furthermore, when the initial dummy characteristic object is a modified layer, the laser may be, for example, a picosecond laser or the like.

FIG. 5 shows the initial dummy characteristic object 130 formed in the dummy glass plate 110 by irradiating the laser.

The number of the initial dummy characteristic objects 130 is not particularly limited. Two or more initial dummy characteristic objects 130 may be formed.

The initial dummy characteristic object 130 has a characteristic part 132 on the first dummy surface 112 of the dummy glass plate 110.

A configuration of the characteristic part 132 varies depending on a type of the initial dummy characteristic object 130. For example, the characteristic part 132 is an aperture of a hole, a void, or a modified region.

Here, a diameter of the characteristic part 132 is assumed to be $\phi_1$. Although the diameter $\phi_1$ varies depending on the configuration of the characteristic part 132, the diameter $\phi_1$ may fall within a range of 1 μm to 100 μm. However, when the initial dummy characteristic object 130 is a modified line, the diameter $\phi_1$ of the characteristic part 132 may be less than 1 μm.

(Step S113)

Next, the dummy glass plate 110 having the initial dummy characteristic object 130 is subjected to wet etching. According to the wet etching, the thickness of the dummy glass plate 110 decreases. Moreover, the initial dummy characteristic object is changed to a through hole.

At the step S113, by performing the wet etching for the dummy glass plate 110 so as to obtain various reductions of the thickness of the dummy glass plate 110, relationship between amounts of etching E (reduction amounts of thickness) for the dummy glass plate 110 and diameters $\phi$ of the holes on the first dummy surface 112 (in other words, a diameter of the characteristic part 132 after the wet etching) is grasped.

FIG. 6 schematically shows an example of a relationship between amounts of etching E and diameters $\phi$ of the holes on the first dummy surface 112 (in the following, referred to as a "E-$\phi$ relationship").

In the example illustrated in FIG. 6, a first order correlation, i.e. a correlation of a line A can be found between the amounts of etching E and the diameters $\phi$ of the holes on the first dummy surface 112. However, this is merely an example, and the E-$\phi$ relation may be a more complicated relation such as a second order function or an exponent function.

At this step, the entirety of the dummy glass plate 110 may be subjected to the wet etching, or the wet etching may be performed in the state where the second dummy surface 114 is masked (mask process). The mask process may be performed by adhering a film, coating with a resist or the like. After the wet etching, the film or the coating layer can be removed.

(Steps S115 to S117)

Next, as illustrated in FIG. 6, from the E-$\phi$ relation, obtained as above, an amount of etching $E_t$ for increasing the diameter of the through hole on the first dummy surface 112 (i.e. the diameter of the characteristic part 132) from $\phi_1$ to $\phi_f$ is calculated.

Moreover, from the result of calculation, based on the following formula (1):

$$\theta_1 = \theta_f + E_t \qquad \text{formula (1)}$$

the thickness $\theta_1$ of the processed glass plate is set.

According to the above-described steps, the thickness $\theta_1$ of the processed glass plate can be calculated.

Next, a glass plate to be provided for the actual process will be prepared. The glass plate to be processed (processed glass plate) has a thickness $\theta_1$ set at the step S110.

Typically, the thickness $\theta_1$ falls, for example, within a range of 50 μm to 1000 μm.

Figure 7:
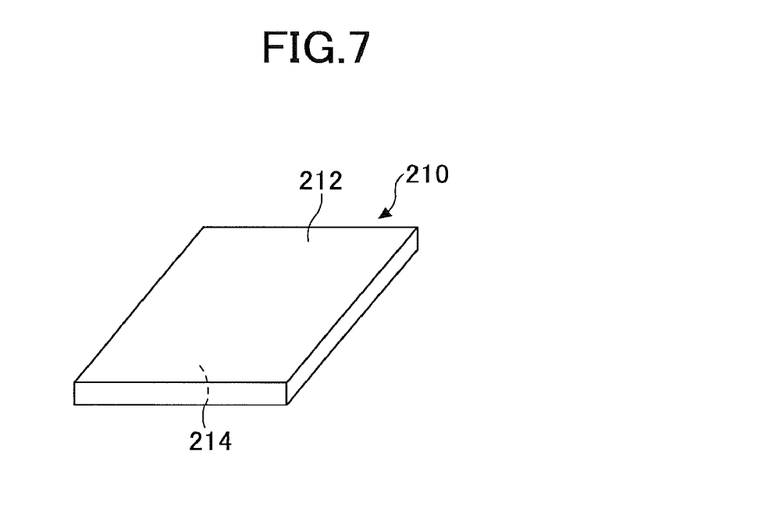
FIG. 7 is a diagram schematically illustrating one mode of the processed glass plate according to the embodiment of the present invention.

FIG. 7 schematically illustrates one mode of the processed glass plate 210. The glass plate 210 has a first surface 212 and a second surface 214 opposite to each other.

In the example illustrated in FIG. 7, the glass plate 210 has a configuration of an approximate rectangular shape (e.g. a shape of a panel). However, this is merely an example, and the shape of the glass plate 210 is not particularly limited. The glass plate 210 may have an approximate circular shape (e.g. a shape of a wafer).

Moreover, a manufacturing method for the glass plate 210 is not particularly limited as long as the glass plate 210 has the same composition as the above-described dummy glass plate 110. For example, the glass plate 210 may be manufactured by any conventional process, such as a float process, a fusion process, and a down-draw process.

Among the processes, the fusion process is preferable because of the feature that the thickness of the glass plate 210 can be controlled easily.

For example, in the fusion process, when a volume of glass flowed from a fusion pipe per unit time is M ($mm^3$/sec), a drawing rate in the vertical direction is v (mm/sec), and a width of a glass plate is W (mm), a thickness of the glass plate t (mm) is expressed by $$t = M/(W \times v) \qquad \text{formula (2)}$$

where the width W and the thickness t are values on the side of the flowed port.

Therefore, by controlling the volume M, the drawing rate v, and the width W, the thickness t can be controlled relatively easily. In this way, in the fusion process, the glass plate 210 with a thickness $\theta_1$ can be manufactured relatively easily.

(Step S130)

Next, by irradiating with a laser from a side of the first surface 212 of the glass plate 210, one "initial characteristic object" or two or more "initial characteristic objects" is formed in the glass plate 210.

As described above, the "initial characteristic object" means any structure that can be generated in the glass plate 210 by the laser irradiation.

For example, the "initial characteristic object" may be a "hole", such as a through hole or a non-through hole. Such a "hole" will be especially referred to as an "initial hole" in order to distinguish from the "hole" formed at the subsequent step S140. Moreover, according to the same reason, the through hole and the non-through hole formed at this step will be referred to as an "initial through hole" and an "initial non-through hole", respectively.

Alternatively, the "initial characteristic object" may be a void array configured by a plurality of voids arranged from the first surface 212 of the glass plate 210 toward the second surface 214.

Moreover, the "initial characteristic object" may be a modified layer formed in a line-shape from the first surface 212 of the glass plate 210 toward the second surface 214. Such a modified layer is also referred to as a "modified line".

Furthermore, the "initial characteristic object" may include two or more selected from the initial through hole, the initial non-through hole, the void array, and the modified line.

A type and an irradiating condition of the laser used at the step S130 are the same as the type and the irradiating condition of the laser, with which the dummy glass plate 110 is irradiated at the above-described step S110.

For example, when the initial characteristic object is an initial through hole or an initial non-through hole, the laser may be, for example, a $CO_2$ laser, a UV laser, or the like.

Moreover, for example, when the initial characteristic object is a void array, the laser may be, for example, a femtosecond laser or the like. Furthermore, when the initial characteristic object is a modified layer, the laser may be, for example, a picosecond laser or the like.

Figure 8:
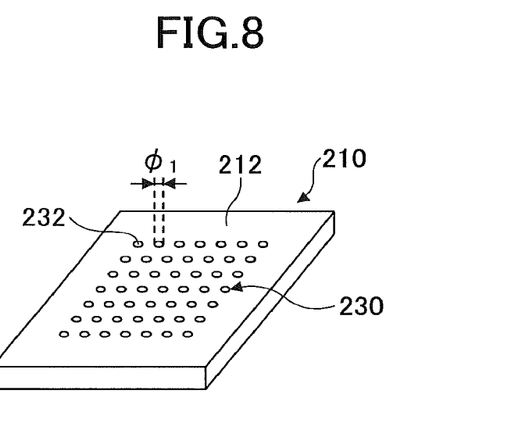
FIG. 8 is a diagram schematically illustrating a glass plate on which numerous initial characteristic objects are formed.

FIG. 8 schematically illustrates a state where numerous initial characteristic objects 230 are formed in the glass plate 210.

As illustrated in FIG. 8, each initial characteristic object 230 is formed so as to have a dimension of a diameter $\phi_1$ on the first surface 212 of the glass plate 210. In other words, each initial characteristic object 230 has a characteristic part 232 with a diameter $\phi_1$ on the first surface 212 of the glass plate 210.

For example, when the initial characteristic object 230 is a through hole or a non-through hole, the characteristic part 232 is an aperture with a diameter $\phi_1$ existing on the first surface 212. Moreover, when the initial characteristic object 230 is a modified line, the characteristic part 232 is a modified region with a diameter $\phi_1$ existing on the first surface 212. When the initial characteristic object 230 is a void array, the characteristic part 232 is an aperture with a diameter $\phi_1$ or a modified region existing on the first surface 212.

The diameter $\phi_1$ of the characteristic part 232 varies depending on the type of the initial characteristic object 230, but the diameter $\phi_1$ may fall, for example, within a range of 1 μm to 100 μm. When the initial characteristic object 230 is a modified line, the diameter $\phi_1$ of the characteristic object 232 may be less than 1 μm.

In the example illustrated in FIG. 8, on the first surface 212 of the glass plate 210, initial characteristic objects 230 are arranged 7-by-7 at equal distances. However, it is necessary to note that this is merely an example, and a number and a mode of arrangement of the initial characteristic objects 230 are not particularly limited.

(Step S140)

Next, the glass plate 210 having the initial characteristic object 230 is subjected to the wet etching. Then, a through hole is formed from the initial characteristic object 230.

For example, when the initial characteristic object 230 is an initial through hole, according to the wet etching, a cross section of the initial characteristic object 230 is expanded, for change to a larger through hole. Moreover, when the initial characteristic object 230 is an initial non-through hole, according to the wet etching, the non-through hole is changed to a through hole penetrating from the first surface 212 to the second surface 214. Moreover, when the initial characteristic object 230 is a void array, according to the wet etching, the respective voids configuring the void array are connected each other, and a through hole penetrating from the first surface 212 to the second surface 214 is formed. Furthermore, when the initial characteristic object 230 is a modified line, according to the wet etching, a modified part is removed, and a through hole penetrating from the first surface 212 to the second surface 214 is formed.

In any case, the diameter of the initial characteristic object 230 on the first surface 212 is increased from $\phi_1$ of the stage of the characteristic part 232 to $\phi_2$.

The condition for the wet etching is selected so that the amount of etching E for the glass plate 210 is the above-described $E_f$. As is clear from formula (1), in this case, according to the wet etching process, the thickness $\theta_1$ of the glass plate 210 is changed to $\theta_f$.

Moreover, the diameter $\phi_2$ of the through hole obtained after the wet etching process on the first surface 212 is equal to $\phi_f$ from the above-described E-$\phi$ relationship.

As a result, after the wet etching, a glass substrate with a desired thickness ($\theta_f$) having a desired diameter ($\phi_f$) of the through hole on the first surface 212 can be obtained.

In this way, in the first manufacturing method, it is possible to solve or significantly control against the problem in the conventional method that after performing a wet etching process for adjusting a size of a hole, a thickness of a glass substrate deviates from a target thickness $\theta_f$.

The thickness of the glass plate (glass substrate) can be measured by a general size measuring apparatus, such as a micrometer or a laser displacement gauge.

The diameter $\phi_1$ of the initial characteristic object or the diameter $\phi_f$ of the formed hole can be measured by using a laser microscope or an image measuring system (for example, NEXIV by Nikon Corporation). When the shape viewed from above the initial characteristic object is not a precise circle, the maximum diameter is set to the diameter $\phi_1$.

(Another Method of Manufacturing a Glass Substrate Having a Hole According to Embodiment of Present Invention)

In the above-described first manufacturing method, the glass plate 210 prepared at the step S120 has substantially the same size (in the following, referred to as a "horizontal by vertical size") as the glass substrate obtained after the step S140, except for the thickness (However, more precisely, a decrease in size appropriate for an amount of a decrease in thickness occurs). In other words, apparent areas of the first and second surfaces 212, 214 of the glass plate 210 do not greatly change even after the glass plate 210 is processed into the glass substrate (while a small decrease due to the wet etching is present).

Typically, the horizontal by vertical size of the glass plate often does not coincide with the horizontal by vertical size of the glass substrate. That is, typically, a step (cutting step) of cutting the glass plate into pieces having a predetermined size, and obtaining one glass piece or two or more glass pieces from the glass plate is performed, in the middle of the process.

Then, next, with reference to FIGS. 9 to 11, an embodiment of the manufacturing method of the present invention including the cutting process will be described.

Figure 9:
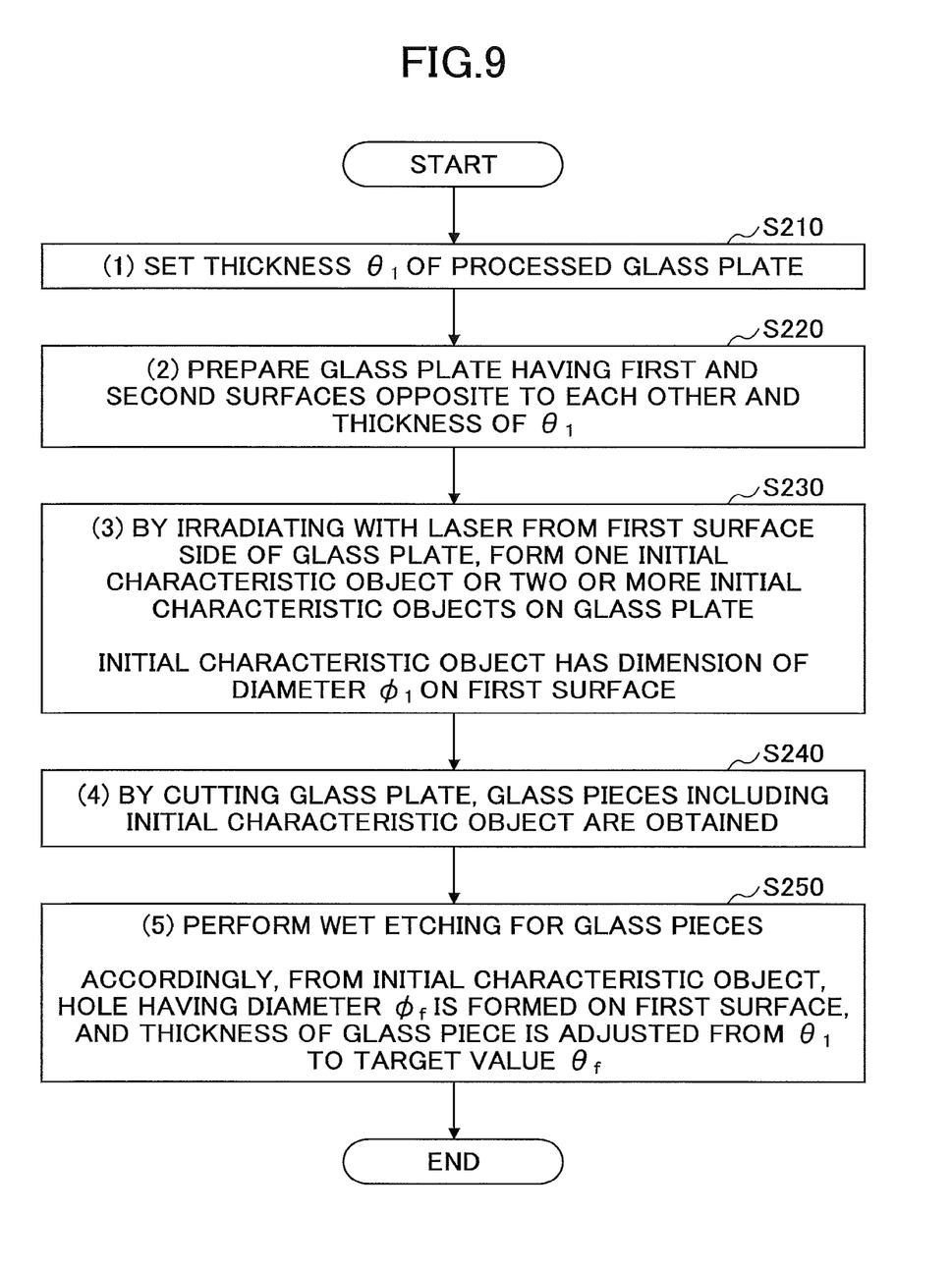
FIG. 9 is a diagram schematically illustrating a flow of another method of manufacturing a glass substrate with a hole according to the embodiment of the present invention.

FIG. 9 schematically illustrates a flow of another method of manufacturing a glass substrate with a hole according to the embodiment of the present invention. FIGS. 10 and 11 schematically illustrate modes of respective processes in another method of manufacturing a glass substrate with a hole according to the embodiment of the invention.

As illustrated in FIG. 9, this other method of manufacturing a glass substrate having a through hole according to the embodiment of the present invention (in the following, referred to as a "second manufacturing method") includes (1) setting a thickness $\theta_1$ of a processed glass plate (step S210);

(2) preparing a glass plate having first and second surfaces opposite to each other, and the thickness $\theta_1$ (step S220);

(3) forming one initial characteristic object or two or more initial characteristic objects on the glass plate by irradiating with a laser from a first surface side of the glass plate, the initial characteristic object having a size of a diameter $\phi_1$ on the first surface (step S230);

(4) cutting the glass plate, and obtaining a glass piece including the initial characteristic object (step S240); and (5) performing wet etching for the glass piece having the initial characteristic object, so that from the initial characteristic object a hole having the diameter $\phi_f$ on the first surface is formed, and the thickness of the glass piece is adjusted from $\theta_1$ to a target value of $\theta_f$ (step S250).

In the following, with reference to FIGS. 10 to 11, the respective steps will be described in detail. Here, as an example, the case where the hole formed at step S250 is a through hole will be described. Therefore, assuming that the second manufacturing method is a method of manufacturing a glass substrate having a through hole, the respective steps will be explained. However, it will be obvious for a person skilled in the art, that the following description can be applied similarly also to the method of manufacturing a glass substrate having a non-through hole.

Moreover, in the second manufacturing method, steps S210 to S230 are the same as the steps S110 to S130 in the first manufacturing method, respectively, and the above-described explanation can be referred to.

Then, in the following, processes after step S240 or later will be described.

(Step S240)

In the second manufacturing method, by performing processes up to step S230, an initial characteristic object is formed in the glass plate.

Figure 10:
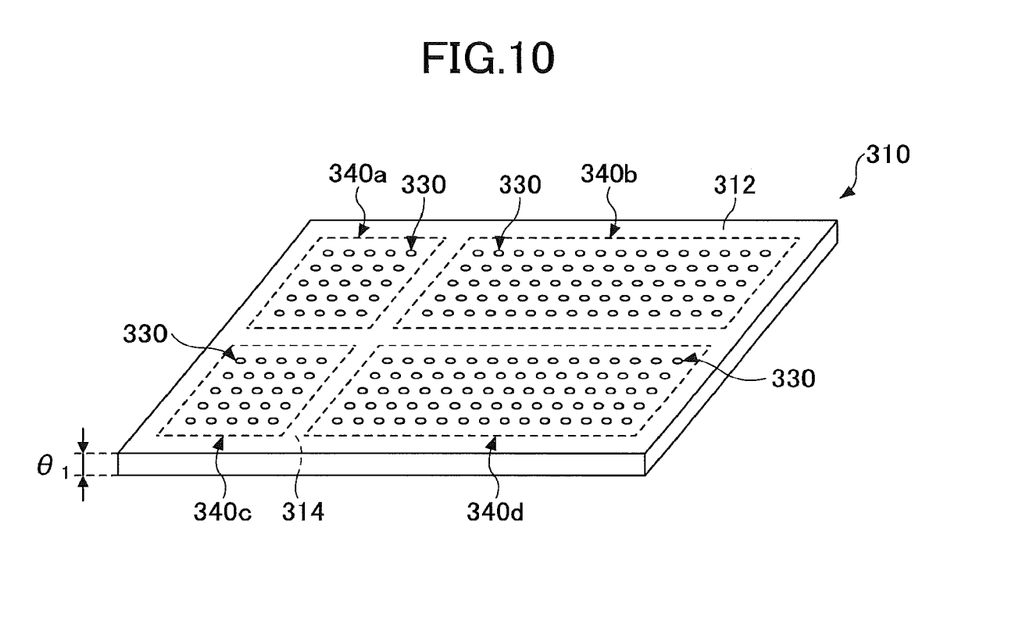
FIG. 10 is a diagram schematically illustrating a mode of a process in the another method of manufacturing a glass substrate with a hole according to the embodiment of the invention.

FIG. 10 schematically illustrates a mode of the glass plate having an initial characteristic object.

As illustrated in FIG. 10, the glass plate 310 has first and second surfaces 312 and 314, opposite to each other, and a thickness of $\theta_1$.

On the glass plate 310 numerous initial characteristic objects 330 are formed.

Here, on the first surface 312 of the glass plate 310, a virtual region surrounded by dashed lines and including a plurality of initial characteristic objects 330 will be referred to as a "region to be cut". The "region to be cut" becomes a criterion to set sections of the glass substrate which will be manufactured later. In other words, the "region to be cut" is arranged so as to fit the size of the glass substrate to be finally manufactured.

In the example, illustrated in FIG. 10, on the first surface 312, four regions to be cut, a first region to be cut 340a to a fourth region to be cut 340d, are arranged.

In the first region to be cut 340a, initial characteristic objects 330 are arranged in a 5×5 matrix. In the second region to be cut 340b, initial characteristic objects 330 are arranged in a 15×5 matrix. In the third region to be cut 340c, initial characteristic objects 330 are arranged in a 5×5 matrix. In the fourth region to be cut 340d, initial characteristic objects 330 are arranged in a 15×5 matrix.

However, the above-described configuration is merely an example, a number and an arrangement mode of the initial characteristic objects 330 included in each region to be cut are not particularly limited. In a typical example, there is a case where initial characteristic objects 330, a number of which falls within a range of 10,000 to 1,000,000, exist in each region to be cut.

The numbers of initial characteristic objects 330 existing in the respective regions to be cut may be different from each other.

Next, the glass plate 310 is cut. At this time, the glass plate 310 is cut so that the respective regions to be cut 340a to 340d are separated from each other. In other words, the glass plate 310 is cut so that respective glass pieces after cutting include the regions to be cut 340a to 340d, respectively.

A method of cutting is not particularly limited as long as the glass plate 310 can be cut. For example, the glass plate 310 may be cut by a diamond wheel.

Figure 11:
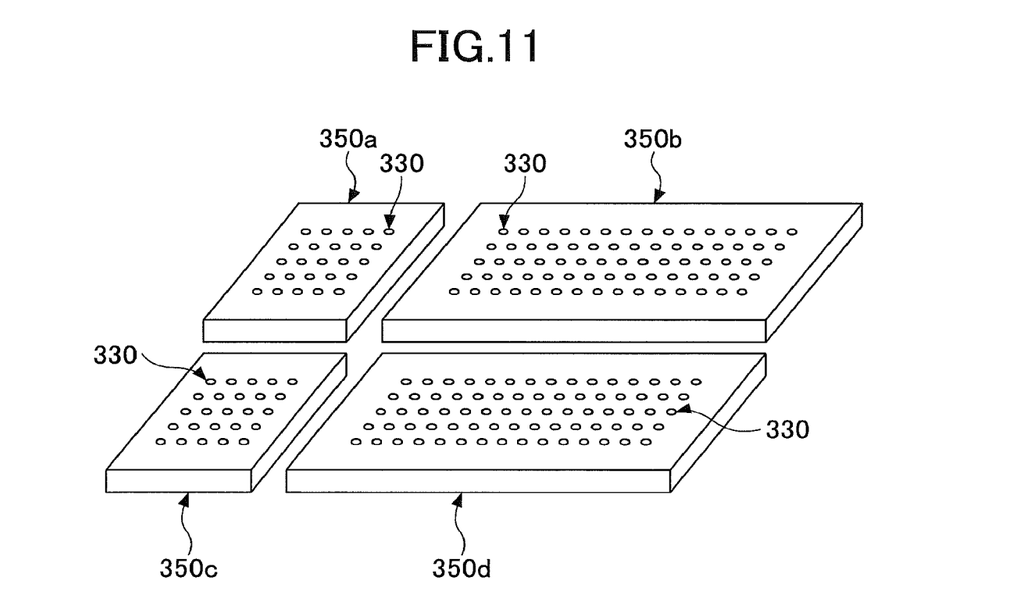
FIG. 11 is a diagram schematically illustrating another mode of a process in the another method of manufacturing a glass substrate with a hole according to the embodiment of the invention.

FIG. 11 schematically illustrates a state after cutting the glass plate 310.

As illustrated in FIG. 11, by cutting the glass plate 310, glass pieces 350a to 350d are obtained. More specifically, by cutting the glass plate 310 so as to include the first region to be cut 340a, or cutting at a position corresponding to this, the first glass piece 350a is obtained. Similarly, by cutting the glass plate 310 so as to include the second region to be cut 340b, or cutting at a position corresponding to this, the second glass piece 350b is obtained. By cutting the glass plate 310 so as to include the third region to be cut 340c, or cutting at a position corresponding to this, the third glass piece 350c is obtained. By cutting the glass plate 310 so as to include the fourth region to be cut 340d, or cutting at a position corresponding to this, the fourth glass piece 350d is obtained. In FIG. 11, an example of obtaining a glass piece of an approximate rectangular shape (e.g. a shape of a panel) has been illustrated. However, the shape of the obtained glass piece is not particularly limited. The shape of the obtained glass piece may have an approximate circular shape (e.g. a shape of a wafer).

(Step S250)

Afterwards, for the respective glass pieces 350a to 350d, a wet etching process, explained in the above-described step S140, is performed.

By performing the wet etching for the respective glass pieces 350a to 350d obtained as above, a cut surface is chamfered, and strength of the glass substrate is improved.

According to the above-described processes, a glass substrate with a desired thickness ($\theta_f$) having a desired diameter ($\phi_f$) of the through hole on the first surface 312 can be manufactured.

Also in the above-described second manufacturing method, it is possible to solve or significantly control against the problem in the conventional method that after performing a wet etching process for adjusting a size of a hole, a thickness of a glass substrate deviates from a target thickness $\theta_f$.

In the case of irradiating a glass plate with a laser to form an initial characteristic object, in order to prevent the glass plate during the laser processing from moving, a suction table is often used. The suction table has a function of fixing the table through suction from its upper part. Therefore, by performing the laser processing for the glass plate on the suction table, the glass plate during processing is prevented from moving and an initial characteristic object can be formed at a predetermined position.

However, generally, the glass substrates having holes are of various sizes depending on their use. Therefore, in the case of manufacturing a glass substrate with a hole using the general conventional method, suction tables of various sizes adapted to the sizes of the glass substrates are required. In order to manufacture such suction tables appreciable time and cost are required. As a result there is a problem that manufacturing efficiency and manufacturing cost for glass substrates increase.

In the second manufacturing method, irrespective of a size of a glass substrate that is required finally, at step S230, for the glass plate that is laser processed, a glass plate with the same size can be always used. This is because the glass plate is separated into glass pieces corresponding to the sizes of the glass substrates at step S240.

Therefore, in the second manufacturing method, it becomes unnecessary to prepare various suction tables as in the related art. That is, in the second manufacturing method, when one suction table having a size that adapts to the glass plate is prepared, a glass substrate of any size can be manufactured through the suction table.

As a result, in the second manufacturing method, it becomes possible to control the manufacturing efficiency and the manufacturing cost significantly.

(Yet Another Method of Manufacturing a Glass Substrate Having Hole According to Embodiment of Present Invention)

Next, with reference to FIG. 12, an example of yet another method of manufacturing a glass substrate having hole according to the embodiment of the present invention will be described.

Figure 12:
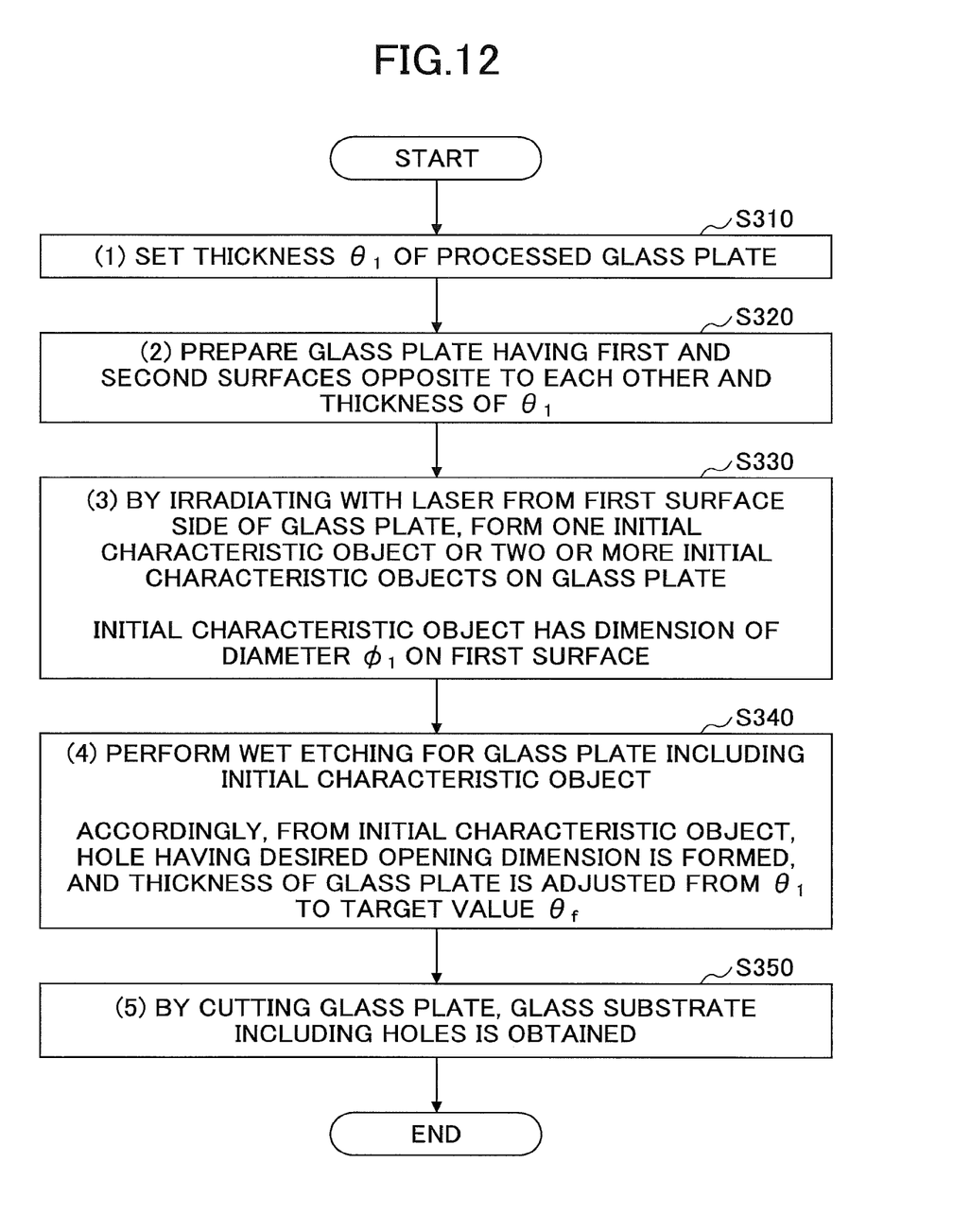
FIG. 12 is a diagram schematically illustrating a flow of yet another method of manufacturing a glass substrate with a hole according to the embodiment of the present invention.

FIG. 12 schematically illustrates a flow of yet another method of manufacturing a glass substrate with a hole according to the embodiment of the present invention.

As illustrated in FIG. 12, yet another method of manufacturing a glass substrate having a through hole according to the embodiment of the present invention (in the following, referred to as a "third manufacturing method") includes (1) setting a thickness $\theta_1$ of a processed glass plate (step S310);

(2) preparing a glass plate having first and second surfaces opposite to each other, and the thickness $\theta_1$ (step S320);

(3) forming one initial characteristic object or two or more initial characteristic objects on the glass plate by irradiating with a laser from a first surface side of the glass plate, the initial characteristic object having a size of a diameter $\phi_1$ on the first surface (step S330);

(4) performing wet etching for the glass plate having the initial characteristic object, so that from the initial characteristic object a hole having a desired aperture size is formed, and the thickness of the glass plate is adjusted from $\theta_1$ to a target value of $\theta_f$ (step S340); and (5) cutting the glass plate, and obtaining a glass substrate including the hole (step S350).

The third manufacturing method includes almost the same processes as the second manufacturing method illustrated as above with reference to FIGS. 9 to 11. However, the third manufacturing method is different from the above-described second manufacturing method in that the step of cutting the glass plate to obtain the glass substrate (step S350) is performed after the wet etching (step S340).

The respective steps S310 to S350 in the third manufacturing method are obvious from the respective steps in the above-described second manufacturing method. Therefore, detailed description for the respective steps in the third manufacturing method will be omitted.

Also in the third manufacturing method, it is possible to solve or significantly control against the problem in the conventional method in which after performing a wet etching process for adjusting a size of a hole, a thickness of a glass substrate deviates from a target thickness $\theta_f$.

Moreover, also in the third manufacturing method, it becomes possible to obtain the same effect as the second manufacturing method, i.e. the effect can be obtained that it becomes unnecessary to prepare various suction tables, as in the related art, and it becomes possible to control the manufacturing efficiency and the manufacturing cost significantly.

In the third manufacturing method, a process of filling a material into the hole may be performed between the step (4) and the step (5).

The material includes a conductive material.

The conductive material may be configured by, for example, gold, silver, copper, nickel, aluminum, neodymium, molybdenum, and/or tungsten, or an alloy including these. For example, the conductive material may be configured by an aluminum-neodymium alloy, or a molybdenum-tungsten alloy.

A method of filling the material into a hole is not particularly limited. For example, the material may be filled into the hole by an electroless plating process. Alternatively, the material may be filled into the hole by a screen printing process for a conductive paste or conductive fine particles.

Because by performing a process of filling a material into a hole at this stage, it becomes unnecessary to perform a process of filling a material for each glass substrate obtained after the step (5), thus the filling process can be performed efficiently. Moreover, according to the above-described configuration it becomes possible to further control the manufacturing efficiency and the manufacturing cost.

As described above, with reference to the first to third manufacturing method, an embodiment of the present invention has been described. However, the present invention is not limited to these embodiments. For example, in the above-described examples, a glass substrate having a through hole is finally manufactured.

However, in addition to this, a glass substrate having a non-through hole may be finally manufactured. In this case, the initial characteristic object may be an initial non-through hole, a void array, or a modified line.

For example, when the initial characteristic object is an initial non-through hole, by a wet etching, the initial non-through hole may change to a non-through hole having a larger aperture on the first surface. Moreover, when the initial characteristic object is a void array, by a wet etching, the respective voids configuring the void array are connected each other, and a non-through hole may be formed. Furthermore, when the initial characteristic object is a modified line, according to the wet etching, a modified part is removed, and a non-through hole may be formed.

In addition to the above-described examples, various modifications may be possible.

EXAMPLES

Next, an example of the present invention will be described.

Example 1

A glass substrate having a non-through hole was manufactured according to the following method. A target value of a diameter of the non-through hole on the first surface (diameter of a larger aperture) was 40 µm ($\phi_f$=40 µm). Moreover, a target value of a thickness of the glass substrate was 200 µm ($\theta_f$=200 µm).

First, a dummy glass plate of 50 mm (vertical)×50 mm (horizontal)×0.3 mm (thickness) (alkali-free glass) was prepared.

The dummy glass plate was irradiated with a laser from a side of the first surface, to form an initial non-through hole. The irradiation condition for the laser was as follows:

Type of laser: YAG laser (wavelength: 355 µm); and

Laser power: 10 W.

A diameter ($\phi_1$) of an aperture of the initial non-through hole on the first main surface was about 12 µm.

Next, the dummy glass plate was subjected to a wet etching process with various conditions, and a relationship between an amount of etching (amount of reduction of thickness) E and a diameter $\phi$ of an aperture of a non-through hole, i.e. an E-$\phi$ relationship was obtained.

The dummy glass plate was provided to the wet etching process in a state where a second main surface was subjected to a mask process. Therefore, the second main surface of the glass plate was not etched.

Figure 13:
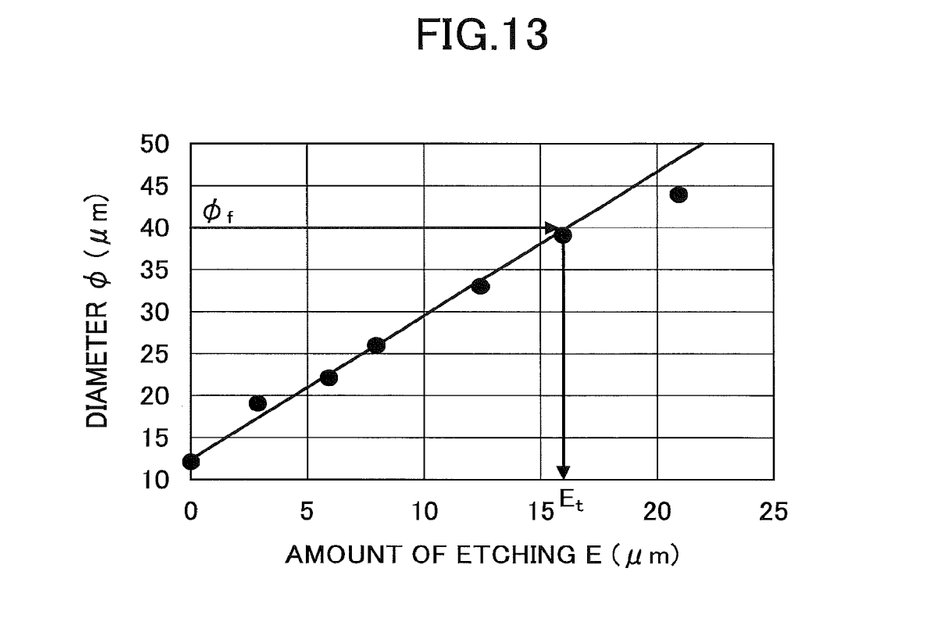
FIG. 13 is a diagram schematically showing a relationship between amounts of etching E and diameters $\phi$ of the through holes obtained in an example 1.

FIG. 13 illustrates a graph of the obtained E-φ relationship.

From the graph, it was found that a first order relation was established between the amount of etching E and the diameter φ of the aperture of the non-through hole. Moreover, from the result, it was found that the amount of etching ($E_t$) of about 16 μm was required in order to obtain the glass substrate having a hole with the diameter $\phi_f$ of 40 μm.

Based on the above-described result, according to the formula (1):

$$\theta_1 = \theta_f + E_t \qquad \text{formula (1)}$$

the thickness ($\theta_1$) of the glass plate to be prepared was $\theta_1 = 216$ μm.

Thus, next, a glass plate of 300 mm (vertical)×300 mm (horizontal)×216 μm (thickness) ($\theta_1$) (alkali-free glass) was prepared.

Moreover, the glass plate was irradiated with a laser from a side of the first surface, to form an initial non-through hole. The irradiation condition for the laser was the same as that used for the dummy glass plate.

A diameter of an aperture of the initial non-through hole on the first surface was about 12 μm.

Next, the glass plate was subjected to a wet etching process, in a state where a second surface of the glass plate was masked. The condition for a wet etching was that the amount of etching E was $E_t$ (=16 μm).

A measured thickness of the glass plate obtained after the wet etching process was 200 μm. Moreover, a diameter of an aperture of the non-through hole on the first surface was about 40 μm.

In this way, the glass substrate having a desired thickness $\theta_f$ and having a non-through hole with a desired diameter $\phi_f$ was manufactured.

Example 2

A glass plate having a through hole was manufactured. A target value of a diameter of the through hole on the first surface (diameter of a larger aperture) was 40 μm ($\phi_f$=40 μm). Moreover, a target value of a thickness of the glass substrate was 200 μm ($\theta_f$=200 μm).

First, a dummy glass plate of 50 mm (vertical)×50 mm (horizontal)×0.3 mm (thickness) (alkali-free glass) was prepared.

The dummy glass plate was irradiated with a laser from a side of the first surface, to form an initial through hole. The irradiation condition for the laser was as follows:

Type of laser: YAG laser (wavelength: 355 μm); and
Laser power: 10 W.

A diameter ($\phi_1$) of an aperture of the initial through hole on the first main surface was about 12 μm.

Next, the dummy glass plate was subjected to a wet etching process with various conditions, and a relationship between an amount of etching (amount of reduction of thickness) E and a diameter φ of an aperture of a through hole, i.e. an E-φ relationship was obtained.

The entirety of the dummy glass plate was subjected to the wet etching process without masking a second main surface.

Figure 14:
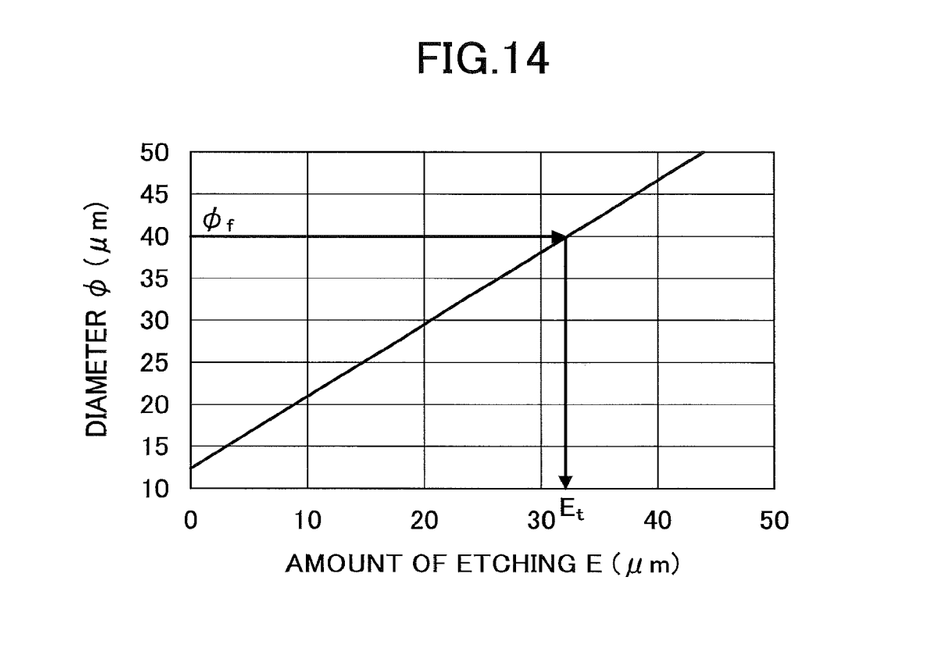
FIG. 14 is a diagram schematically showing a relationship between amounts of etching E and diameters $\phi$ of the through holes obtained in an example 2.

FIG. 14 illustrates a graph of the obtained E-φ relationship.

From the graph, it was found that a first order relation was established between the amount of etching E and the diameter φ of the aperture of the through hole. Moreover, from the result, it was found that an amount of etching ($E_t$) of about 32 μm was required in order to obtain the glass substrate having the hole with the diameter $\phi_f$ of 40 μm.

Based on the above-described result, according to the formula (1):

$$\theta_1 = \theta_f + E_t \qquad \text{formula (1)}$$

the thickness ($\theta_1$) of the glass plate to be prepared was $\theta_1 = 232$ μm.

Thus, next, a glass plate of 300 mm (vertical)×300 mm (horizontal)×232 μm (thickness) ($\phi_1$) (alkali-free glass) was prepared.

Moreover, the glass plate was irradiated with a laser from a side of the first surface, to form an initial through hole. The irradiation condition for the laser was the same as that used for the dummy glass plate.

A diameter of an aperture of the initial through hole on the first surface was about 12 μm.

Next, the entirety of the glass plate was subjected to a wet etching process. The condition for a wet etching was that the amount of etching E was $E_t$ (=32 μm).

A measured thickness of the glass plate obtained after the wet etching process was 200 μm. Moreover, a diameter of an aperture of the through hole on the first surface was about 40 μm.

In this way, the glass substrate having a desired thickness $\theta_f$ and having a through hole with a desired diameter $\phi_f$ was manufactured.

INDUSTRIAL APPLICABILITY

The present invention can be used, for example, in a technique for forming a hole in a glass substrate. Moreover, the present invention can be used, for example, in a manufacturing method for a glass substrate for a substrate provided with a through electrode, or a glass substrate for an interposer (glass interposer). For example, when a hole formed in the glass substrate is a through hole, by forming a through electrode in the through hole of the glass substrate, a glass substrate with a through electrode, and an interposer (glass interposer) can be manufactured. For example, when a hole formed in the glass substrate is a non-through hole, by thinning the glass substrate by polishing or grinding, before or after filling a material into a hole to become a through electrode into the hole of the glass substrate, a glass substrate with a through electrode and an interposer can be manufactured.

As described above, the preferred embodiments and the like have been described in detail. However, the present invention is not limited to the above-described specific embodiments, but various variations and modifications may be made without deviating from the scope of the present invention.

What is claimed is:

1. A method of manufacturing a glass substrate with an initial characteristic having object a diameter φf, and with a thickness θf, the method comprising:
    (1) forming one initial characteristic object in a glass plate by irradiating the glass plate having a first surface and a second surface and a thickness of θ1; with a laser from a side of the first surface of the glass plate, the initial characteristic object having a size of a diameter φ1, on the first surface; and
    (2) wet etching the glass plate having the initial characteristic object, so that from the initial characteristic object has a diameter φf on the first surface is formed, and a thickness of the glass plate is reduced from θ1 to a target value of θf, wherein the thickness θ1 of the glass plate equals the sum of θf plus the reduction in thickness Et of the glass plate after completion of the etching step; and wherein the thickness of glass plate removed in the etching step is determined by (i) irradiating a dummy glass plate which has a same composition as the glass plate and has a first dummy surface and a second dummy surface opposite to each other, with the laser from a side of the first dummy surface, with a same condition as in the step (1), to form an initial dummy characteristic object in the dummy glass plate, the initial dummy characteristic object having a size of the diameter φ1 on the first dummy surface;

(ii) performing wet etching of the dummy glass plate under substantially the same conditions as in step (2), and obtaining a relationship between an amount of etching for the dummy glass plate, and a diameter on the first dummy surface of a hole that has been formed by performing wet etching of the initial dummy characteristic object;

(iii) setting, from the relationship, an amount of etching Et for obtaining the hole having the diameter θf on the first dummy surface; and (iv) setting the thickness θ1 of the glass plate to be processed from a relation θ1=θf+Et.

2. The manufacturing method according to claim 1, wherein the initial characteristic object is at least one selected from a group including an initial through hole, an initial non-through hole, a void array, and a modified line.

3. The manufacturing method according to claim 1, wherein the hole is a through hole or a non-through hole.

4. The manufacturing method according to claim 1, wherein a size of the glass plate in the step (2) is larger than a size of the glass substrate, wherein the manufacturing method further includes between the step (1) and the step (2) cutting the glass plate and obtaining a glass piece including the initial characteristic object, and wherein in the step (2), the wet etching is performed for the glass piece obtained in the cutting step.

5. The manufacturing method according to claim 1, wherein a size of the glass plate in the step (1) is larger than a size of the glass substrate, and wherein the manufacturing method further includes after the step (2) cutting the glass plate and obtaining a glass substrate including the hole.

6. The manufacturing method according to claim 1, wherein in the step (2), the glass plate is manufactured by a fusion process.

7. The manufacturing method according to claim 6, wherein when a volume of glass flowed from a fusion pipe per unit time is M (mm3/sec), a drawing rate in a vertical direction is v (mm/sec), and a width of a glass plate is W (mm), a thickness of the glass plate t (mm) is expressed by $$t=M/(W \times v),$$

and wherein by controlling at least one of the volume M, the drawing rate v, and the width W, the thickness $\theta_1$ is adjusted.

8. The manufacturing method according to claim 1, wherein the glass substrate is a glass substrate for a glass substrate with a through electrode.

9. The manufacturing method according to claim 1, wherein the glass substrate is a glass substrate for a glass interposer.

* * * * *